April 19, 1960     V. GIACALONE     2,933,289
VEHICLE JACK
Filed July 3, 1956     2 Sheets-Sheet 1
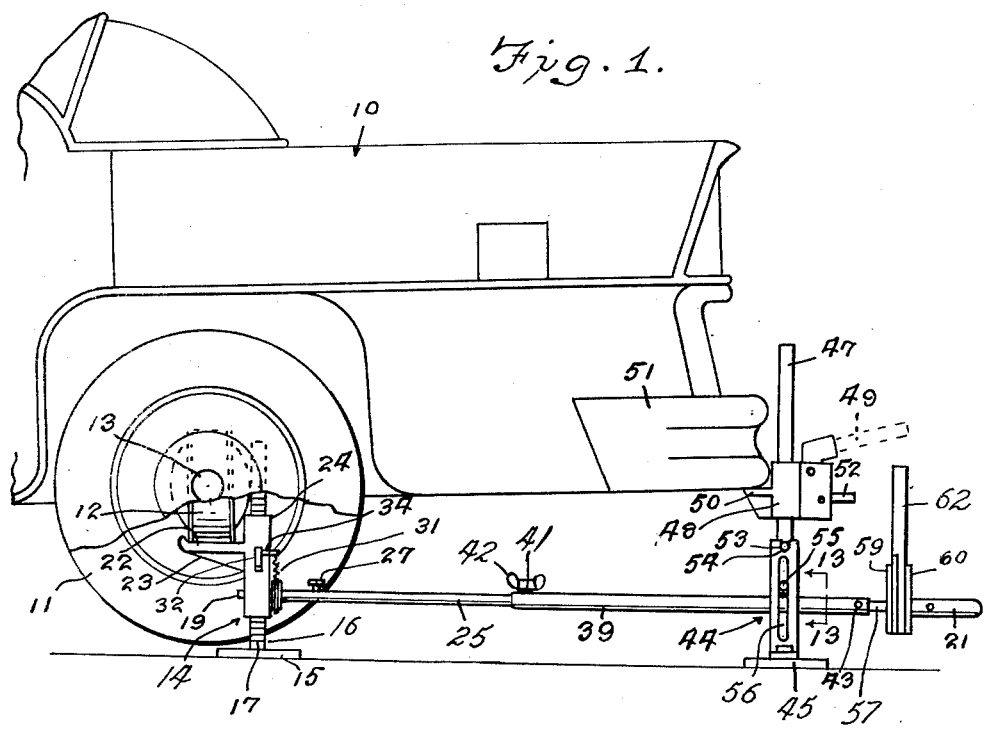
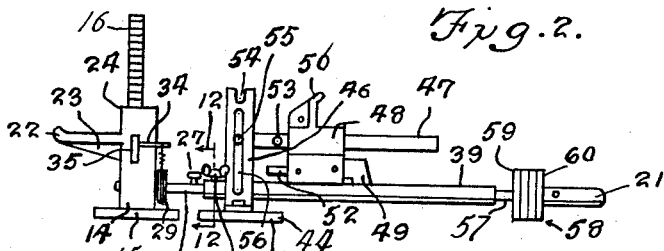
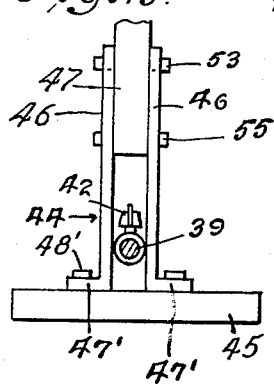
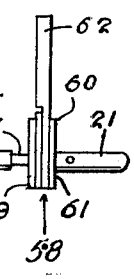
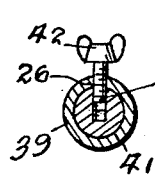
INVENTOR.
Victor Giacalone
BY Victor J. Evans & Co.
ATTORNEYS

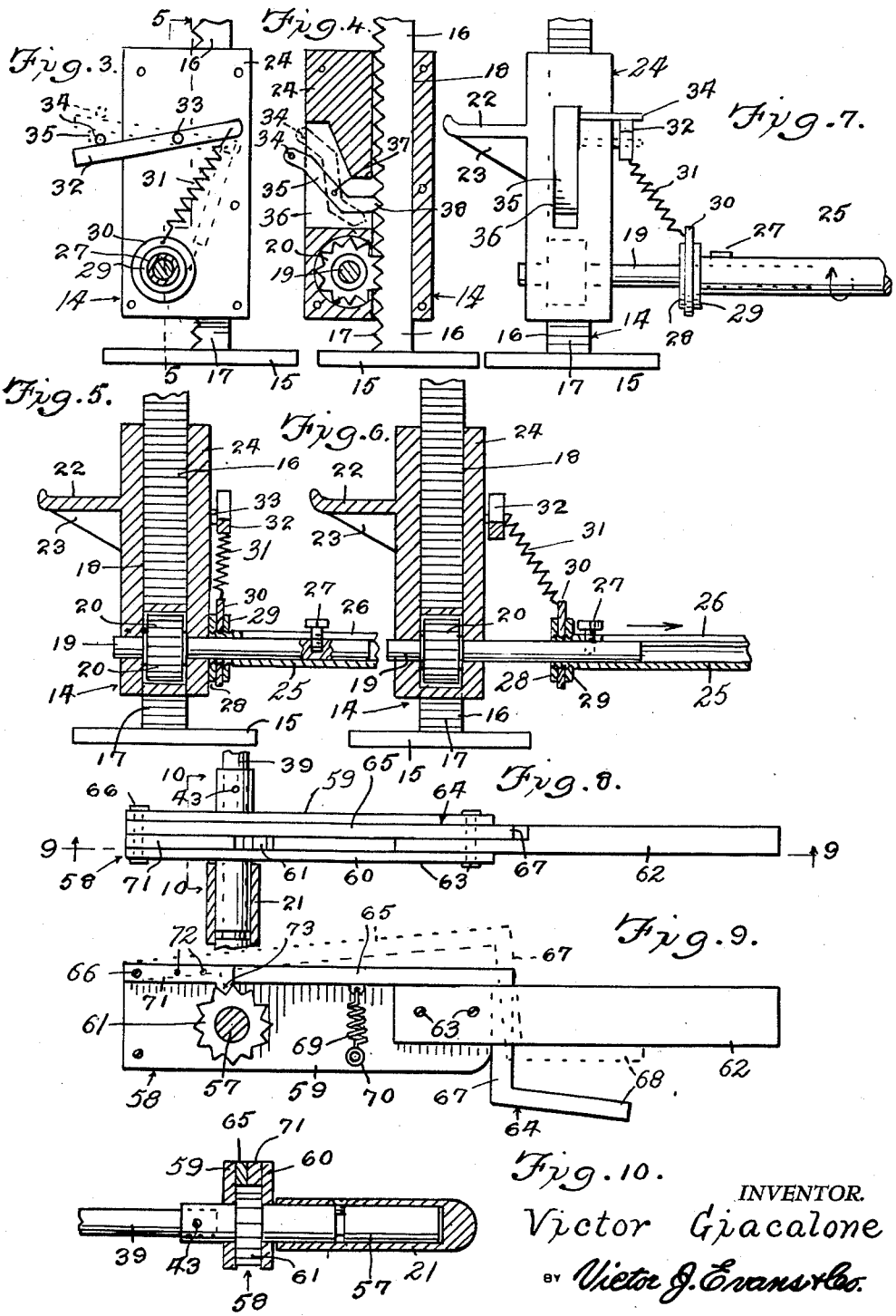

United States Patent Office 2,933,289
Patented Apr. 19, 1960

2,933,289

VEHICLE JACK

Victor Giacalone, Vineland, N.J.

Application July 3, 1956, Serial No. 595,654

1 Claim. (Cl. 254—95)

This invention relates to a jacking mechanism, and more particularly to a jacking mechanism for use with a vehicle.

The object of the invention is to provide a jacking mechanism which will facilitate the elevation of a portion of a vehicle such as the rear end of an automobile as when a tire is to be changed.

Another object of the invention is to provide a jacking mechanism for use in elevating a portion of a vehicle such as the rear end of the vehicle, the jacking mechanism of the present invention including two separate mechanisms which engage spaced apart portions of the vehicle whereby there is provided an additional safety feature which insures that the vehicle will be maintained in its proper elevated position so that the danger to a person working on the vehicle or beneath the vehicle will be minimized.

A further object of the invention is to provide a vehicle jack mechanism which can be readily folded or collapsed when it is not being used so as to occupy a minimum amount of space for storage or shipment.

A further object of the invention is to provide a vehicle jack mechanism which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a fragmentary side elevational view illustrating the jack mechanism of the present invention being used for elevating the rear portion of a vehicle.

Figure 2 is a side elevational view of the jack mechanism, showing the parts in collapsed or folded position as when the jack is not being used.

Figure 3 is a transverse sectional view illustrating the housing and its associated parts.

Figure 4 is a sectional view taken through the assembly of Figure 3.

Figure 5 is a sectional view taken on the line 5—5 of Figure 3.

Figure 6 is a view similar to Figure 5 but showing the parts in shifted position as when the housing is to be lowered.

Figure 7 is a fragmentary elevational view illustrating certain constructional details of the device and showing the parts in the shifted position of Figure 6.

Figure 8 is a fragmentary plan view of a manually operable ratchet mechanism.

Figure 9 is a sectional view taken on the line 9—9 of Figure 8.

Figure 10 is a sectional view taken on the line 10—10 of Figure 8.

Figure 11 is an elevational view illustrating the shaft and sleeve and associated parts detached as when the device is being disassembled.

Figure 12 is a sectional view taken on the line 12—12 of Figure 2.

Figure 13 is a sectional view taken on the line 13—13 of Figure 1.

Referring in detail to the drawings, the numeral 10 designates a portion of a vehicle such as an automobile which is provided with the usual rear wheels 11, differential 12 and axle 13.

The present invention is directed to a jacking mechanism which includes a first jack 14, the jack 14 including a horizontally disposed base 15 which has a bar 16 extending upwardly therefrom. The bar 16 is provided with a plurality of teeth 17, and a housing 24 has a cutout 18 through which extends the bar 16. A shaft 19 is rotatably arranged in the housing 24, and the shaft 19 has a gear 20 thereon. Extending outwardly from the housing 24 and secured thereto or formed integral therewith is a lip 22 which is adapted to engage beneath the differential 12 or axle 13 so as to provide a means for raising the vehicle as when a tire is to be changed or when the vehicle is to be otherwise worked on. A reinforcing rib 23 may be arranged below the lip 22.

A sleeve 25 is connected to an end of the shaft 19 by means of a pin or bolt 27, Figure 6, and the sleeve 25 is provided with an elongated slot 26 therein for a purpose to be later described. Mounted on the sleeve 25 is a pair of spaced parallel discs or washers 28 and 29, there being a washer 30 interposed between the pair of washers 28 and 29, and the washer 30 is stationary with respect to the washers 28 and 29. A coil spring 31 has one end connected to the disc or washer 30, while the other end of the coil spring 31 is connected to a link 32 which is pivotally connected to a portion of the housing 24 through the medium of a pivot pin 33. A finger 34 is arranged in engagement with an end of the link 32, and the finger 34 is secured to a dog 35. The dog 35 is movably mounted in the cutout 36 in the housing 24, and the dog 35 is pivotally connected to the housing 24 by means of a pivot pin 37. The dog 35 is provided with a pointed end 38 which engages the teeth 17 on the stationary bar 16.

Arranged in telescopic relation with respect to an end of the sleeve 25 is a hollow cylindrical rod 39. A bolt or securing element 41 extends through the slot 26 and the sleeve 25. A wing nut 42 is arranged on the outer end of the bolt 41 so that the bolt 41 can be readily rotated as when it is being adjusted.

There is further provided a second jack which is indicated generally by the numeral 44, and the jack 44 includes a base 45 which is spaced from the base 15. A pair of spaced parallel legs 46 are provided with flanges 47' on their lower ends, and the flanges 47' are secured to the base 45 through the medium of securing elements 48'. The legs 46 are spaced apart as shown in the drawings, and the rod 39 extends between the legs 46. A standard 47 extends upwardly from the legs 45, and a jacking mechanism 48 is adjustably mounted on the standard 47. The jacking mechanism 48 may be of conventional construction, and a handle 49 may be provided for use in causing the jacking mechanism to travel up the standard 47. The jacking mechanism 48 is provided with a lip 50 which is adapted to engage beneath the rear bumper 51 of the vehicle 10. The jacking mechanism 48 is further provided with a release pin 52 which functions in the usual manner and a guide lug 53 extends outwardly from the standard 47, the guide lug 53 adapted to seat in a cutout 54 in the legs 46. A pivot pin 55 serves to pivotally connect the standard 47 to the legs 46, and the pivot pin 55 may extend through a slot 56 in each of the legs. Thus, by means of the pivotal connection between the standard 47 and the legs 46, the parts can be collapsed or folded to the position shown in Figure 2 as when the device is not being used, so that the mechanism will occupy a minimum amount of space for storage or shipment.

Connected to the end of the rod 39 by means of a bolt or pin 43 is a stud or casing 57, and mounted on the stud 57 is a manually operable ratchet 58, there being a hand grip 21 on the stud 57. A detailed construction of the ratchet 58 is illustrated in Figures 8, 9 and 10. Thus, the ratchet 58 includes a pair of spaced parallel plates 59 and 60, and there is further provided a gear member 61 which is mounted on the stud 57. A handle piece 62 may have a portion thereof secured between the plates 59 and 60 through the medium of securing elements 63. A handle member 64 is provided, and the handle member 64 includes a first portion 65 which is pivotally mounted on a pivot pin 66. The handle member 64 further includes a second portion 67 and a third portion 68 which is adapted to be engaged by a person's fingers. A coil spring 69 has one end connected to the portion 65 of the handle member 64, while the other end of the coil spring 69 is connected to an anchor pin 70. A pawl or dog 71 is secured to the portion 65 of the handle member 64 by means of suitable securing elements 72, and the pawl 71 is provided with a toothed or pointed end 73 which engages the teeth of the gear member 61, Figure 10.

From the foregoing, it is apparent that there has been provided a jack mechanism which permits a vehicle to be elevated with greater safety, since the mechanism engages two spaced apart portions of the vehicle as shown in Figure 1. In use, with the parts arranged as shown in Figure 1, the handle piece 62 can be gripped and rotated about a horizontal axis, and this rotation or back and forth movement of the handle piece 62 causes the tooth 73 to rotate the gear wheel 61, and as the gear wheel 61 rotates it causes rotation of the stud 57. This rotation of the stud 57 causes rotation of the rod 39 since the stud 57 and rod 39 are connected together by the bolt 43. As the rod 39 rotates, it rotates the sleeve 25 since the securing element 41 connects the sleeve 25 and rod 39 together. As the sleeve 25 rotates, it rotates the shaft 19 since the pin 27 connects the sleeve 25 and shaft 19 together. This rotation of the shaft 19 causes rotation of the gear 20 and since the gear 20 meshes with the teeth 17 on the bar 16, this rotation of the shaft 19 will result in vertical adjustment of the housing 24 along the stationary bar 16, the shaft 19 being journaled in the housing 24. As the housing 24 moves up, it causes the lip 22 to move upwardly so that the axle 13 or differential 12 of the vehicle 10 can be raised to permit a tire such as the tire 11 to be changed or to permit a person to conveniently work beneath the vehicle.

It is to be noted that the rod 39 may extend through the space between the pair of legs 46 as shown in the drawings. Furthermore, the legs 46 provide a support for the pivotally mounted standard 47, and the jack mechanism 48 is adjustably connected to the standard 47. By manipulating the handle 49, the jack mechanism 48 may be caused to move up and down on the standard 47 in a conventional manner. The jack mechanism 48 is provided with the lip 50 which engages beneath the bumper such as the rear bumper 51 so that it will be seen that with the lip 50 engaging beneath the bumper 51, and with the lip 22 engaging beneath the differential 12, that two spaced apart portions of the vehicle are securely gripped and raised so that even though one of the jacks may fail, the vehicle will still be supported in a raised or elevated position so that persons can work beneath the vehicle or adjacent to the vehicle with increased safety.

As shown in Figure 2, the device can be readily moved to a folded or collapsed position so as to occupy a minimum amount of space for storage or shipment. Thus, when the device is not being used, the bolt 41 can be loosened or moved whereby the rod 39 can be telescoped onto the sleeve 25. Furthermore, the pin 53 can be lifted out of the socket 54 so that the standard 47 can pivot from the position shown in Figure 1 to the position shown in Figure 2, the pin 55 providing a pivotal connection between the standard 47 and the legs 46. Furthermore, the handle piece 62 can be removed if desired.

Due to the provision of the elongated slot 26, it will be seen that the relative position of the rod 39 and sleeve 25 can be adjusted as desired and then the parts can be locked in their various adjusted positions. As previously described, the housing 24 is provided with a release mechanism which is shown in detail in Figures 3 through 7. The coil spring 31 will, at times, cause the link 32 to move from the solid line position in Figure 3 to the broken line position of Figure 3 when the sleeve 25 is moved outwardly along the shaft 19. This pivotal movement of the link 32 moves the dog 35 out of engagement with the teeth 17 of the bar 16 so that the housing 24 can quickly move downward by gravity. The spring 31 is of sufficient strength so that it will at times cause pivotal movement of the link about the pin 33 and this will cause pivotal movement of the finger 34 which is secured to the dog 35 so that for example, when the dog 35 is moved from the solid line position shown in Figure 3 to the dotted line position shown in Figure 3, the pointed tooth 38 will move out of engagement with the teeth 17 on the bar 16 so that the housing 24 and lip 22 can lower as when the vehicle is being brought back to its lowered position. The discs 28 and 29 rotate with the sleeve 25, while the disc 30 has a loose fit between the discs 28 and 29. With the tooth 38 out of engagement with the teeth 17, the housing 24 can move by gravity to its lowered position as when work on the vehicle has been completed. The releasing dog 35 will not be affected as long as the disc 30 is in the neutral position shown in Figure 5 whereby rotation of the sleeve 25 will not cause rotation of the disc 30 so that there will be insufficient increased tension on the coil spring 31 to trip the dog 35. However, when the disc 30 and spring 31 moves to the position shown in Figure 6, the housing 24 can return to its lowered position.

The jack mechanism 48 is provided with the usual trip pin 52 which can be actuated as when the jack mechanism 48 is to be moved to its lowered position. As shown in Figures 5 and 6, the sleeve 25 and its associated parts can be shifted longitudinally on the shaft 19. Thus, with the parts arranged as shown in Figure 5, rotation of the shaft 19 will cause vertical upward movement of the housing 24. However, by shifting the sleeve 25 longitudinally to the position shown in Figure 6, the dog 35 is out of engagement with the teeth 17 so that the housing 24 can lower by gravity. The parts can be moved to the position shown in Figure 6 when the jack 14 or housing 24 is to be moved to lowered position. Thus, by moving the sleeve 25 to the position shown in Figure 6 from the position shown in Figure 5, tension will be put on the spring 31 which will move the dog 35 to the dotted line position shown in Figure 3 so that the housing 24 can drop by gravity.

A detailed view illustrating the ratchet 58 is shown in Figures 8, 9 and 10. Thus, by simultaneously gripping the handle member 64 and handle piece 62, the coil spring 69 can be placed under tension as when the handle member 64 is moved towards the handle piece 62 so that the dog 73 can be moved out of engagement with the gear member 61 whereby the handle piece 62 can be rotated or oscillated back and forth in a desired manner. Thus, by selectively squeezing the handle member 64 towards the handle piece 62, the shaft 19 can be rotated in one direction as when the housing 24 is to be raised. However, by manually moving the handle member 64, the dog 73 can be moved out of engagement with the gear 61 so as to permit a ratchet effect to be accomplished when desired, so that the housing 24 can lower without causing rotation of the ratchet mechanism.

Furthermore, if desired, the jack mechanism 14 can be entirely separated from the jack mechanism 44 so that these two mechanisms can be used separately as for example, on different portions of the vehicle such as the front portion of the vehicle and the rear portion of the vehicle.

With the parts in the position shown in Figure 2, the device can be readily carried in the trunk of the vehicle. The two jacks can be arranged as shown in Figure 1 when a tire, such as the tire 11 is to be changed. By having the jack 14 and the jack 44 working together at the same time, there is provided an additional safety factor for persons working around the vehicle. The parts can be made of any suitable material and in any desired shape or size. The bar 16 is stationary but the housing 24 moves vertically.

When the vehicle is being raised, the parts are in the position shown in Figures 1 and 5. When the vehicle is being lowered, the parts are in the position shown in Figures 6 and 7. By manipulating the ratchet 58, the shaft 19, sleeve 25 and rod 39 can rotate without turning the ratchet 58, as when the vehicle is being quickly lowered.

Thus, it will be seen that there has been provided a folding jack which can be moved to the position shown in Figure 2 when it is not being used. The construction is such that the vehicle can be lowered quickly when desired. In actual practice, the jack 14 can be used to raise the vehicle slightly as for example several inches, and then the jack 44 can be moved into place against the bumper 51 to raise the car the rest of the way. Thus, there is provided a safety arrangement. The length of the jack can be adjusted as desired so that it can be used on different types of vehicles.

I claim:

In a jack, a horizontally disposed base, a bar extending upwardly from said base and said bar being provided with a plurality of teeth, a housing having a cutout for the projection therethrough of said bar, a shaft rotatably arranged in said housing and having a gear thereon, said gear meshing with the teeth on said bar, means for rotating said shaft, a lip extending outwardly from said housing and adapted to engage beneath a portion of a vehicle, a reinforcing rib arranged below said lip, a sleeve connected to an end of said shaft, a pair of discs mounted on said sleeve, a washer interposed between said pair of discs, a coil spring connected to said washer, a link pivotally connected to said housing and said link being connected to said coil spring, a finger arranged in engagement with an end of said housing and said finger being secured to a dog, said dog being pivotally connected to said housing, and said dog being provided with a pointed end which engages the teeth on said bar, and a rod arranged in telescopic relation with respect to an end of said sleeve.

References Cited in the file of this patent
UNITED STATES PATENTS

| Number | Name | Date |
|---|---|---|
| 719,457 | Garland et al. | Feb. 3, 1903 |
| 1,850,513 | Murphy | Mar. 22, 1932 |
| 1,936,596 | Goebert | Nov. 28, 1933 |
| 2,396,103 | Kais | Mar. 5, 1946 |
| 2,450,596 | Kais | Oct. 5, 1946 |
| 2,559,182 | Adams et al. | July 3, 1951 |
| 2,570,359 | Massucci | Oct. 9, 1951 |
| 2,671,636 | Olson | Mar. 9, 1954 |
| 2,753,153 | Shea | July 3, 1956 |